United States Patent [19]

Rosen

[11] 4,278,263

[45] Jul. 14, 1981

[54] QUICK-RELEASE CLAMP FOR MICROTOMES

[75] Inventor: Julius S. Rosen, Buffalo, N.Y.

[73] Assignee: American Optical Corporation, Southbridge, Mass.

[21] Appl. No.: 87,903

[22] Filed: Oct. 24, 1979

[51] Int. Cl.3 .............................................. B23B 31/00

[52] U.S. Cl. .................................. 279/1 R; 83/915.5; 269/236

[58] Field of Search ......................... 279/1 R, 1 L, 33; 269/236; 83/915.5

[56] References Cited

U.S. PATENT DOCUMENTS 2,940,764 6/1960 Kranz ................................ 279/1 R
2,996,762 8/1961 McCormick ...................... 29/559 X

FOREIGN PATENT DOCUMENTS 687947 2/1940 Fed. Rep. of Germany ............ 279/33
952112 3/1964 United Kingdom ..................... 269/236

*Primary Examiner*—Robert D. Baldwin
*Attorney, Agent, or Firm*—Alan H. Spencer

[57] ABSTRACT

A quick-release clamp particularly suitable for microtomes is disclosed. The clamp has several fingers protruding from the face of the clamp assembly to grip an object. A pivotally mounted control arm first moves the protruding fingers away from the face of the assembly and then moves them away from the center axis of the assembly to provide clearance for removal of the object. The object preferably has tabs adapted to extend under a lip portion of the fingers.

5 Claims, 5 Drawing Figures

QUICK-RELEASE CLAMP FOR MICROTOMES

BACKGROUND OF THE INVENTION

The present invention relates to quick-release clamps and objects adapted to be gripped thereby. More particular, the present invention relates to a quick-release clamp having gripping means which moves in two directions to securely hold an object without distortion.

Object clamps for a microtome have conventionally been constructed with a rectangular recess to receive the object and a screw to urge the object against one wall of the recess. This system has the disadvantage that repeated clamping of an object or sustained clamping can cause distortion of the object, even when excessive clamping pressure is not applied by the screw. U.S. Pat. No. 2,996,762 illustrates a clamp of this type and object adapted to be clamped therein.

Recently, a modified clamp using a cam instead of a screw for holding an object has been commercialized. This device suffers the same disadvantages as the screw type clamp although insertion of the object and its release from the clamp may be performed more quickly.

BRIEF DESCRIPTION OF THE PRESENT INVENTION AND DRAWINGS

An object clamp which has two motions provides for secure clamping of the object without distortion. One motion is movement of the clamping fingers relative to each other and the other motion is movement of the clamping fingers perpendicular to the end cover of the clamp whereby the object is pressed against a mounting surface. The sequence is reversed to release the object. Since the sole gripping action is not compressing the object between the clamp fingers, forces that can cause distortion are reduced. Preferably, the object being gripped has tabs to cooperate with the fingers.

DETAILED DESCRIPTION OF THE PREFERRED EMBODIMENTS

Figure 1:
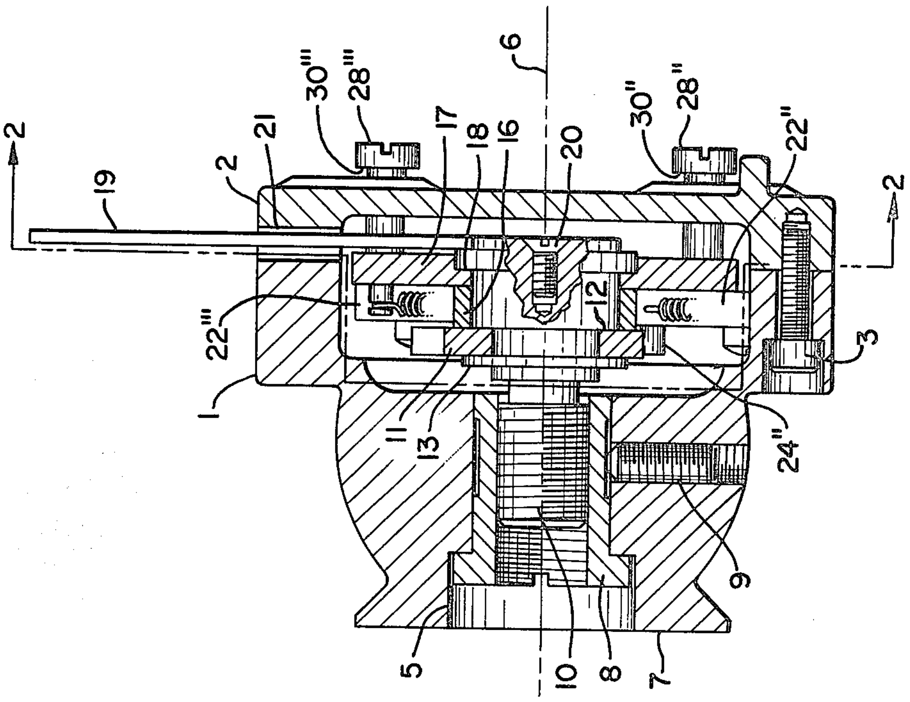
FIG. 1 is a vertical sectional view of an embodiment of the present invention.

Referring to FIG. 1, main body 1 has an end cover 2 fastened thereto by screws 3 (only one shown). Cavity 4 has a cylindrical passage 5 located in body 1 adjacent end cover 2 and passage 5 extending along axis 6 to the distal end 7 of body 1. Sleeve 8 is retained in passage 5 by set screw 9 and has internal threads for cooperating with externally threaded member 10. Cam 11 is held against shoulder 12 of member 10 by lock ring 13. Key 14 extends from recess 15 in cam 11 into a coextensive recess (not shown) in member 10 in order to assure rotation therewith. Spacing ring 16 bears against cam 11 to position plate 17 against shoulder 18 of member 10. Member 10 is free to rotate independent of plate 17, but carries plate 17 during axial movement resulting from cooperation with the threads of sleeve 8. Arm 19 is fixed to the end of threaded member 10 by screw 20 and extends through arcuate gap 21 cut in end cover 2.

Figure 2:
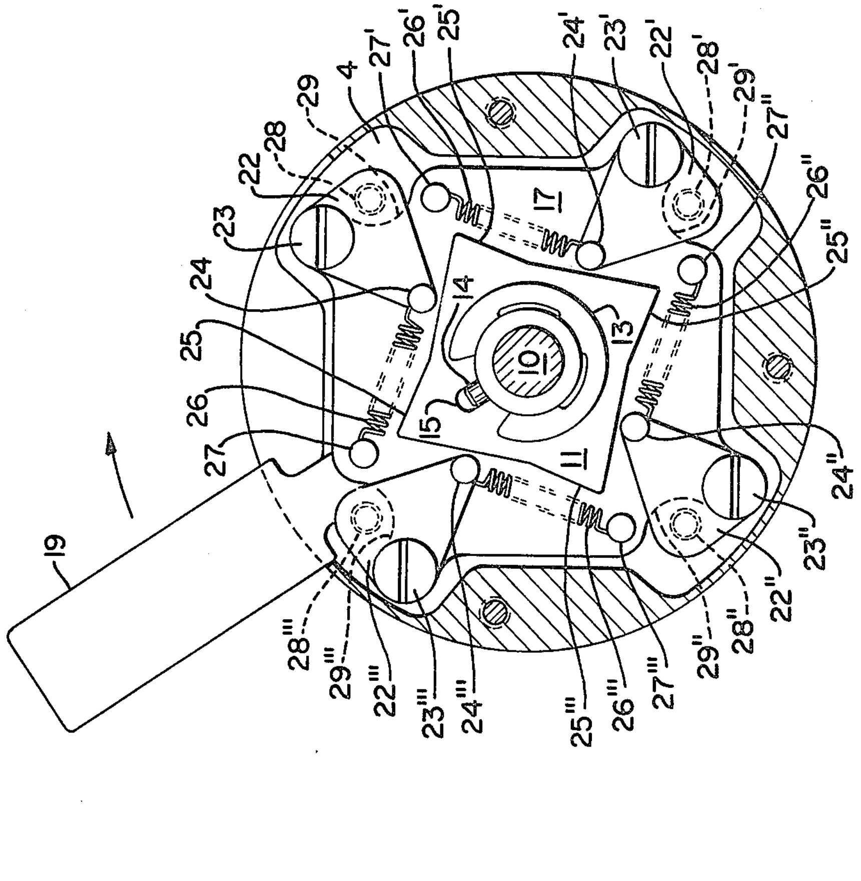
FIG. 2 is a sectional view along line 2—2 in FIG. 1.

Since the preferred embodiment has four fingers actuated in the same way, the following description will only identify the operation with respect to one finger. Referring to FIG. 2 cam follower 22 is pivotally mounted to plate 17 by screw 23. Cam follower 22 has a pin 24, which extends toward cam 11 to cooperate with cam surface 25 when arm 19 is moved in the direction indicated by the arrow. Spring 26 is connected on one end to pin 24 and on the other end to protrusion 27 extending from plate 17 in order to provide a normal position for finger 28 (see FIG. 1) biased against seat 29. As seen in FIG. 1, finger 28 has lip 30 at the end opposite plate 17.

Figure 3:
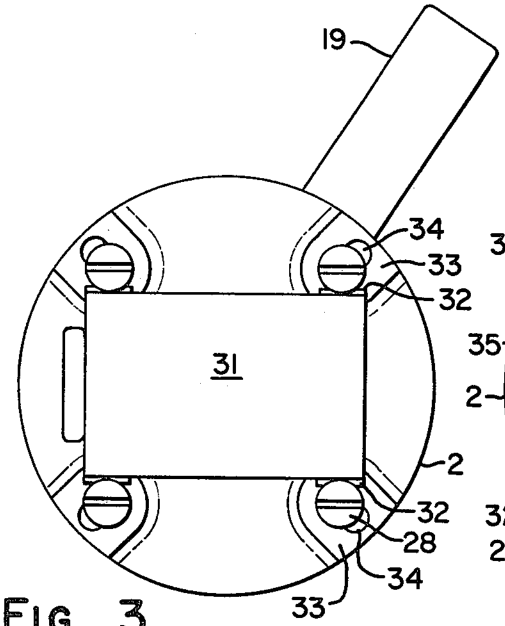
FIG. 3 is a front view showing an object clamped in the embodiment of FIG. 1.
Figure 4:
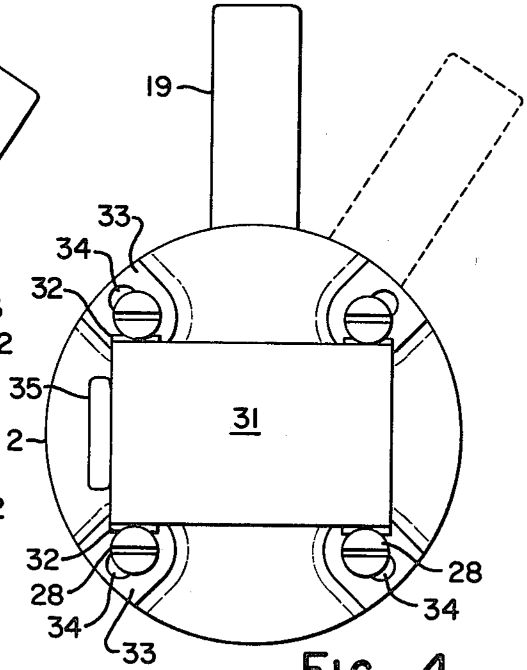
FIG. 4 is a front view showing the position of the actuating arm when only one clamping motion has been applied; and, FIG. 5 is a front view showing the position of the actuating arm when neither clamping motion has been applied.

The operation of the device will now be described by reference to FIGS. 3, 4 and 5. FIG. 3 illustrates a typical object 31 secured against end cover 2 by finger 28. Arm 19 is shown in FIG. 3 in the position for holding object 31. Tab 32 extends from object 31 and is held against surface 33 by lip 30 of finger 28. When arm 19 is moved to the position shown in FIG. 4, the accompanying rotation of threaded member 10 within sleeve 8 (see FIG. 1) causes plate 17 to move lip 30 of finger 28 away from surface 33 thereby relieving the pressure forcing tab 32 against surface 33. Finger 28 may be adjusted individually by a threaded connection to plate 17 in order to provide a uniform spacing between lip 30 and surface 33. The amount of space between lip 30 and surface 33 when in the clamping position shown in FIG. 3 is controlled by rotational adjustment of sleeve 8 (see FIG. 1). The change in spacing due to rotation is obviously controlled by the thread pitch of sleeve 8 and threaded member 10 and may be selected to satisfy the particular requirements for the object being clamped.

Figure 5:
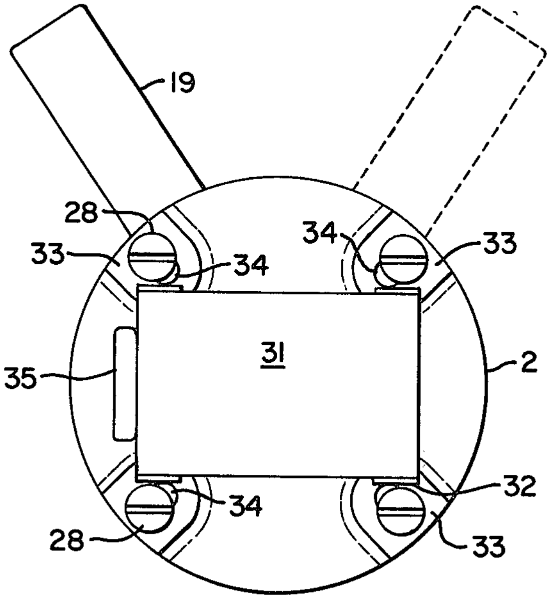

Referring to FIG. 5, arm 19 has been rotated to the extreme of its travel. As arm 19 is rotated from the position shown in FIG. 4 to that shown in FIG. 5, cam surface 25 contacts pin 24 causing cam follower 22 to pivot and move finger 28 in slot 34 away from object 31. Referring again to FIG. 5, it can be seen that object 31 may now be easily removed or replaced without interference by finger 28. Protrusion 35 extends from end cover 2 to act as a reference for centering object 31 for clamping.

In order to clamp an object, the procedure is reversed, i.e., arm 19 is held in the position shown in FIG. 5 until object 31 has been placed against surface 33 and abutting protrusion 35. Referring again to FIG. 2, spring 26 will return arm 19 to the position shown in FIG. 4 accompanied by movement of finger 28 inwardly until it is over tab 32. Manually moving arm 19 to the position shown in FIG. 3 will draw finger 28 toward surface 33 firmly clamping object 31.

What is claimed is:

1. A clamp comprising a main body and retaining means for releasably holding an object against one end of said main body, said body having a cavity with an internally threaded bore on an axis and extending away from said one end a rotatable member threadably engaging said threaded bore for axial movement when said member is rotated, said retaining means including a plurality of object gripping fingers, said rotatable member being connected to said fingers to provide movement in a direction normal to said one end during said axial movement, and means adapted to cooperate with said rotatable member for laterally moving said fingers relative to each other and to said one end.

2. The clamp according to claim 1 wherein said means for lateral movement includes a cam rotatably mounted in said main body and a plurality of cam followers, each of said plurality of fingers being mounted on a respective one of said plurality of cam followers for simultaneous relative movement of said fingers when said cam is rotated.

3. The clamp according to claim 1 further including a carrier and a cam mounted on said rotatable member, said rotatable member being rotatable relative to said carrier, said cam being fixed for rotation with said threaded member, a plurality of cam followers pivotally connected to said carrier, and spaced around said cam, each of said cam followers having one of said fingers mounted thereon, said cam and rotatable member being rotatable through an arc having first and second portions, each of said followers contacting said cam during the first portion of said arc to move said fingers relative to each other and being spaced from said cam during rotation in the second portion of the arc.

4. The clamp according to claim 3 wherein there are four fingers.

5. The clamp according to claim 4 wherein each of said fingers has a lip for drawing the object against said end.

* * * * *